United States Patent [19]

Kimura et al.

[11] Patent Number: 5,248,923
[45] Date of Patent: Sep. 28, 1993

[54] MANIPULATOR USING PLANE PULSE MOTOR

[75] Inventors: Kaoru Kimura; Syuichi Tounai, both of Kitakyushu; Toshio Omata, Kurate, all of Japan

[73] Assignee: Kabushiki Kaisha Yaskawa Denki Seisakusho, Kitakyushu, Japan

[21] Appl. No.: 700,162

[22] PCT Filed: Oct. 10, 1990

[86] PCT No.: PCT/JP90/01276
§ 371 Date: May 15, 1991
§ 102(e) Date: May 15, 1991

[87] PCT Pub. No.: WO91/04835
PCT Pub. Date: Apr. 18, 1991

[30] Foreign Application Priority Data

Oct. 3, 1989 [JP] Japan ................... 1-259860

[51] Int. Cl.$^5$ .................. B25J 9/08; G05B 19/18
[52] U.S. Cl. ................ 318/568.2; 318/687; 318/38; 901/1; 74/479 BP
[58] Field of Search .......... 318/687, 38, 568.2; 901/1, 8; 74/479 BP; 414/751

[56] References Cited

U.S. PATENT DOCUMENTS

| | | | |
|---|---|---|---|
| 4,706,007 | 11/1987 | Nagasaka ............... | 318/687 |
| 4,707,642 | 11/1987 | Sorimachi et al. ....... | 414/729 |
| 4,714,400 | 12/1987 | Barnett et al. .......... | 414/751 |
| 4,756,662 | 7/1988 | Tanie et al. ............. | 318/37 |
| 4,823,062 | 4/1989 | Hoffman et al. ......... | 318/687 |

FOREIGN PATENT DOCUMENTS

| | | |
|---|---|---|
| 2538743 | 7/1984 | France . |
| 259287 | 9/1987 | France . |
| 59-162762 | 9/1984 | Japan . |
| 63-150177 | 6/1988 | Japan . |
| 63-174887 | 7/1988 | Japan . |
| 63-158785 | 10/1988 | Japan . |

OTHER PUBLICATIONS

AT&T Technical Journal, vol. 67, No. 2, Apr. 1988, New York US, pp. 5-14; Lilienthal: "A Flexible Manufacturing Workstation".

*Primary Examiner*—William M. Shoop, Jr.
*Assistant Examiner*—Brian Sircus
*Attorney, Agent, or Firm*—Beveridge, DeGrandi, Weilacher & Young

[57] ABSTRACT

In order to obtain a manipulator using a plane pulse motor showing advantageous features such that even in a case where a moment of force is applied to the manipulator in a falling direction, the moment can be sustained by magnetic attraction caused by the pulse motor, the weight of the manipulator is reduced, the degree of freedom of the movement can be increased, and a rotating mechanism for a tool itself is eliminated; a plurality of movable members are provided on a stator of the plane pulse motor, a rotatable shaft is provided on each movable member so as to extend vertically, the rotatable shafts are connected with each other through a connecting member, a required tool is secured to the connecting member, and the movements of the movable members are made controllable in a manner correlated with each other. The manipulator using the plane pulse motor of the aforementioned construction is most adapted to be used in combination with an industrial robot and the like.

14 Claims, 5 Drawing Sheets

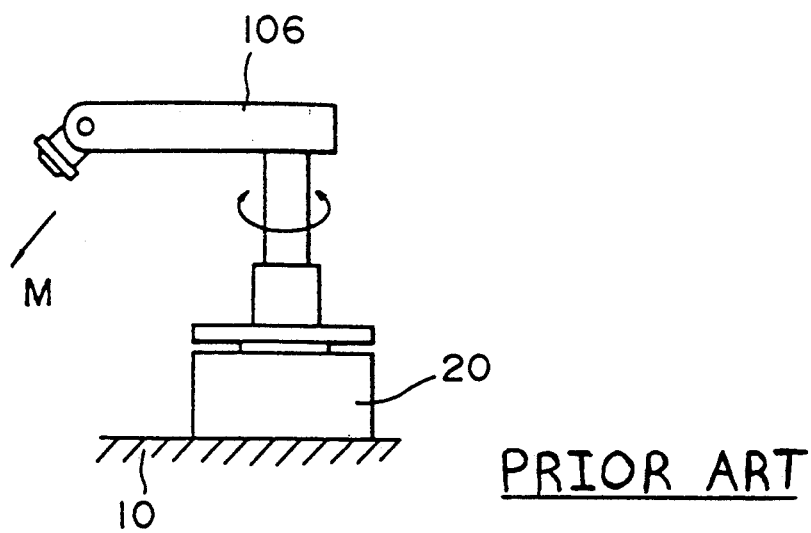
FIG. 10 PRIOR ART
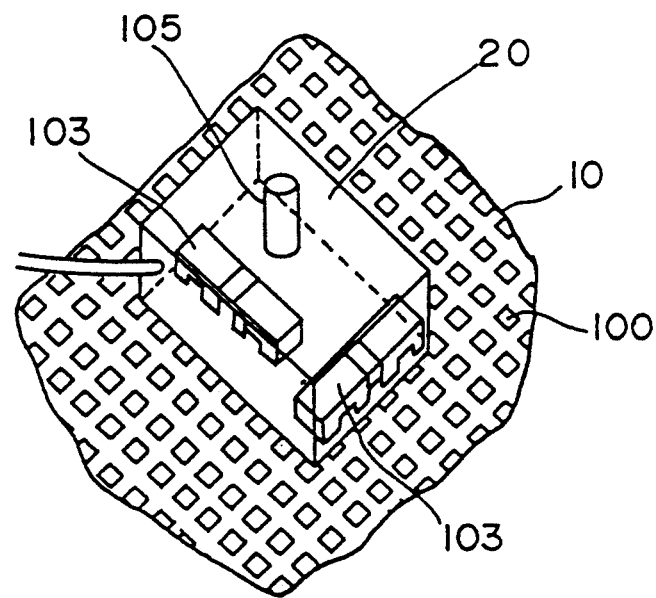
PRIOR ART  FIG. 11
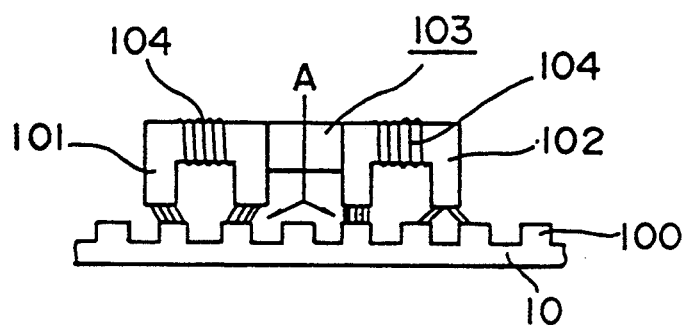
FIG. 12 PRIOR ART

MANIPULATOR USING PLANE PULSE MOTOR

TECHNICAL FIELD OF APPLICATION

This invention relates to a manipulator whose degree of freedom is improved by use of a plane pulse motor freely driven in a two-dimensional manner.

BACKGROUND OF THE INVENTION

As shown in FIGS. 11 and 12, a plane pulse motor comprises a stator 10 having a number of magnetic pieces 100 that are formed by dividing a planar surface of a magnetic substance by orthogonal grooves into a lattice form having a suitable pitch, and also a movable member (armature) 20 comprising two perpendicularly arranged magnetic pole members 103. Each of the magnetic pole members 103 comprises a plurality of magnetic pieces 101, 102 formed out of permanent magnets, each having a plurality of magnetic pole legs with a pitch deviating from the pitch of the lattice of the stator 10 by a half pitch. By the attracting force of the magnetic pole members 103, the movable member 20 of the plane pulse motor is held on the surface of the stator 10, and by controlling exciting coils 104 wound around the magnetic pieces 101 and 102, the movable member 20 is shifted in an arbitrary direction along the surface of the stator 10. For smoothing the movement of the movable member 20 along the surface of the stator 10, air is injected between the member 20 and the stator 10 as shown by an arrow mark A so as to form an air layer.

It is apparent that the stator 10 with the movable member 20 attracted thereon, may be placed not only on the floor, but also on either the side walls or ceiling of a structure.

Because of the above described construction, the plane pulse motor has been heretofore used in combination with a manipulator with a required tool secured to an output shaft of the manipulator for implanting, for instance, electronic parts on a printed circuit board.

In the case of actual application, however, besides the aforementioned arbitrary movement of the movable member 20 along the surface of the stator 10, further degrees of freedom, such as movements around and along the output shaft 105 of the movable member 20, are required. Accordingly, it becomes necessary to mount a separate actuator such as a robot 106 having a rotatable arm as shown in FIG. 10 instead of the output shaft 105 of the movable member 20. However, in a case where a moment M of a falling direction is applied to the movable member 20 as a result of the provision of the separate actuator, the moment M must be restricted in a range not exceeding the moment-withstanding capability of the attracting force applied to the movable member 20, and furthermore, there arise problems such as increasing weight because of the actuator, increasing the size of the movable member 20, and complicating the control of the same.

The object of the present invention is to provide a manipulator using a plane pulse motor wherein the above described problems of the conventional arrangement are eliminated, the construction is simplified and the size is reduced regardless of the provision of a plurality of movable members, while the operation thereof is stabilized, and the degree of freedom of the movement is increased.

DISCLOSURE OF THE INVENTION

In order to achieve the above described object of the present invention, there is provided a manipulator using a plane pulse motor constructed such that a plurality of movable members are provided on a stator of the plane pulse motor, a rotatable shaft is provided on each movable member so as to extend vertically, the rotatable shafts are connected with each other through a connecting member, a required tool is secured to the connecting member, and the movements of the movable members are made controllable in a manner correlated with each other.

According to another embodiment of the present invention, there is provided a manipulator using a plane pulse motor constructed such that a plurality of movable members are provided on a stator of the plane pulse motor, a rotatable shaft is extended vertically from one of the movable members, one end of a link is pivotally connected to the rotatable shaft, another rotatable shaft is extended vertically from the other of the movable members, one side end of two parallel links extending in a spaced apart relation is pivotally connected to another rotatable shaft, a connecting member is pivotally connected to the other end of the one and two links such that a parallelogrammic link mechanism is formed by the connecting member and the two links, a required tool is secured to the connecting member, and the movements of the movable members are made controllable in a manner correlated with each other.

According to still another embodiment of the present invention, there is provided a manipulator using a plane pulse motor constructed such that a plurality of movable members are provided on a stator of the plane pulse motor, a rotatable shaft is provided on each movable member so as to extend vertically, the rotatable shafts are connected directly or through links to a connecting member, a tool supporting spindle is secured to the connecting member, a cover is provided so as to surround the tool supporting spindle and to cover the movable members and the connecting member, and permanent magnets and air bearings are provided on an annular member of the cover, held in opposition to the stator of the plane pulse motor.

According to still another embodiment of the invention, there is provided a manipulator using a plane pulse motor constructed such that a plurality of movable members are provided on a stator of the plane pulse motor, a rotatable shaft is provided on each movable member so as to extend vertically, a connecting member having a length longer than the distance between the movable members is provided to interconnect the rotatable shafts, a required tool is secured to each end of the length of the connecting member, and the movements of the movable members are made controllable in a manner correlated with each other.

BRIEF DESCRIPTION OF THE DRAWINGS

In the accompanying drawings:

FIG. 10 is a profile view showing a conventional example;

FIG. 11 is a perspective view showing a general construction of a plane pulse motor; and FIG. 12 is an explanatory diagram showing the relation between the magnetic pole member and the stator.

EMBODIMENTS MOST ADAPTED FOR PRACTICING THE INVENTION

Preferred embodiments of the manipulator using the plane pulse motor according to the present invention will now be described with reference to the accompanying drawings.

Figure 1:
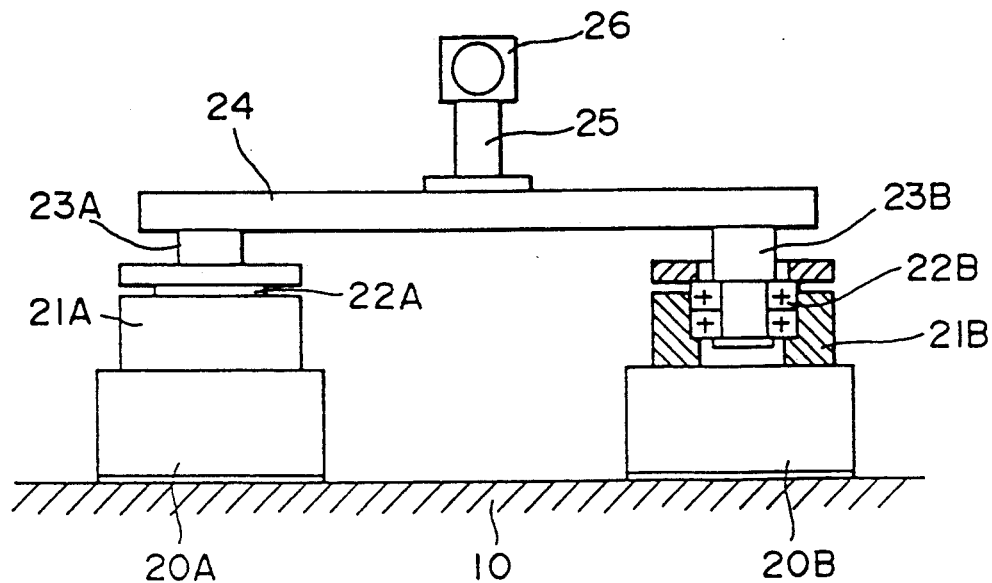
FIG. 1 is a profile view, partly sectioned, showing a preferred embodiment of this invention.
Figure 2:
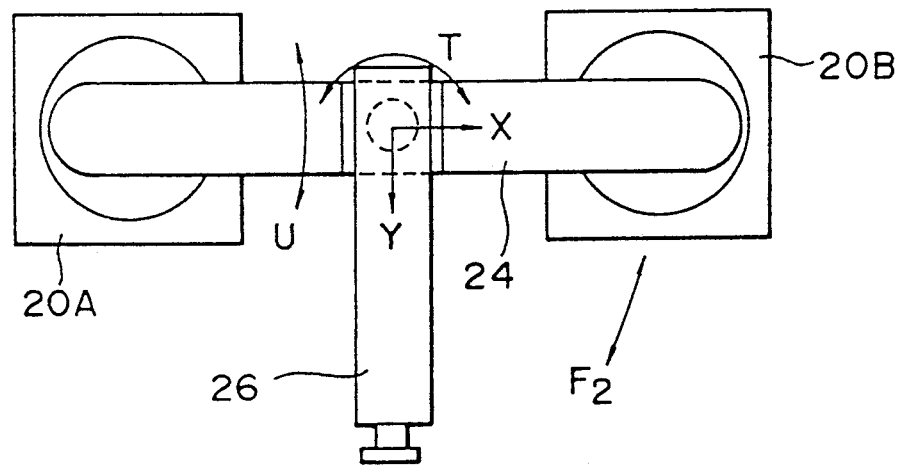
FIG. 2 is a top plan view showing the embodiment shown in FIG. 1.

In an embodiment shown in FIGS. 1 and 2, there is provided a stator 10 having magnetic pieces constructed in a lattice form or arrangement of an X-Y axis, but is simply depicted as a plane. Such illustration is applied to all of the embodiments, and the plan view of the stator 10 is omitted. Numerals 20A and 20B designate movable members (or armatures) of a plane pulse motor similar to the movable member of the conventional example. Bearing housings 21A and 21B are secured onto the movable members 20A and 20B, respectively. Bearings 22A and 22B are encased in the bearing housings 21A and 21B, respectively, for supporting rotatable shafts 23A and 23B that extend perpendicularly to the surface of the stator 10 rotate about a Z-axis. Upper ends of the rotatable shafts 23A and 23B are secured to the corresponding end portions of a connecting member 24. A tool supporting arm 26 is fixedly secured to the connecting member 24 through a vertically extending shaft 25. Lead wires for controlling the movable members 20A and 20B and hoses leading to air bearings provided between the movable members 20A and 20B and the stator 10 are all omitted for simplifying the drawings.

With the aforementioned construction where the vertically extending rotatable shafts 23A and 23B are mounted rotatably on the movable members 20A and 20B provided on the stator 10 in a spaced apart relation, and the rotatable shafts 23A and 23B are secured to both ends of a connecting member 24, when the movable members 20A and 20B are moved in a direction under the control of not illustrated control means, for instance, the tool supporting arm 26 secured to the tool supporting shaft 25 is allowed to move along the axis, y axis, or in an oblique direction. Otherwise, when only the movable member 20B is moved in the arrow-marked direction F2, the tool supporting arm 26 may be rotated in a direction U around the movable member 20A.

Furthermore, when both of the movable members 20A and 20B are moved around the tool supporting vertical shaft 25 in the same rotating direction, the tool supporting arm 26 on the connecting member 24 may be rotated in a direction T, and therefore a rotating mechanism for rotating tool as in the case of the conventional construction can be eliminated.

Figure 3:
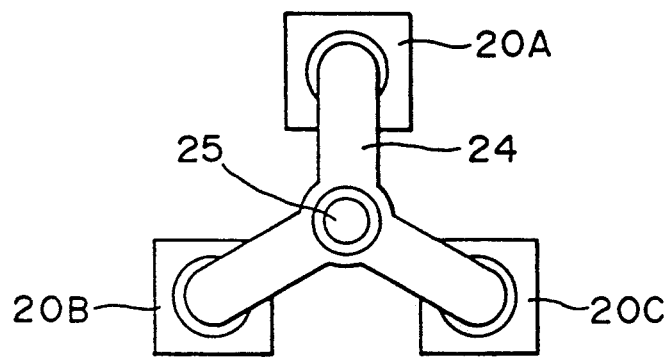
FIG. 3 is a top plan view showing another embodiment of the invention.

When the rotating arm 26 is rotated by the rotating mechanism, the axial line of the rotating arm 26 tends to be displaced from the axial line of the connecting member 24 (FIG. 2 shows a case of 90° displacement), and a moment M of a falling direction tends to occur as shown in FIG. 10. Although in the above described embodiment, this moment M is shared by two movable members, in a case where another movable member 20C is additionally provided as shown in FIG. 3, the rotating operation of the arm and the like can be carried out far more stably.

Figure 4:
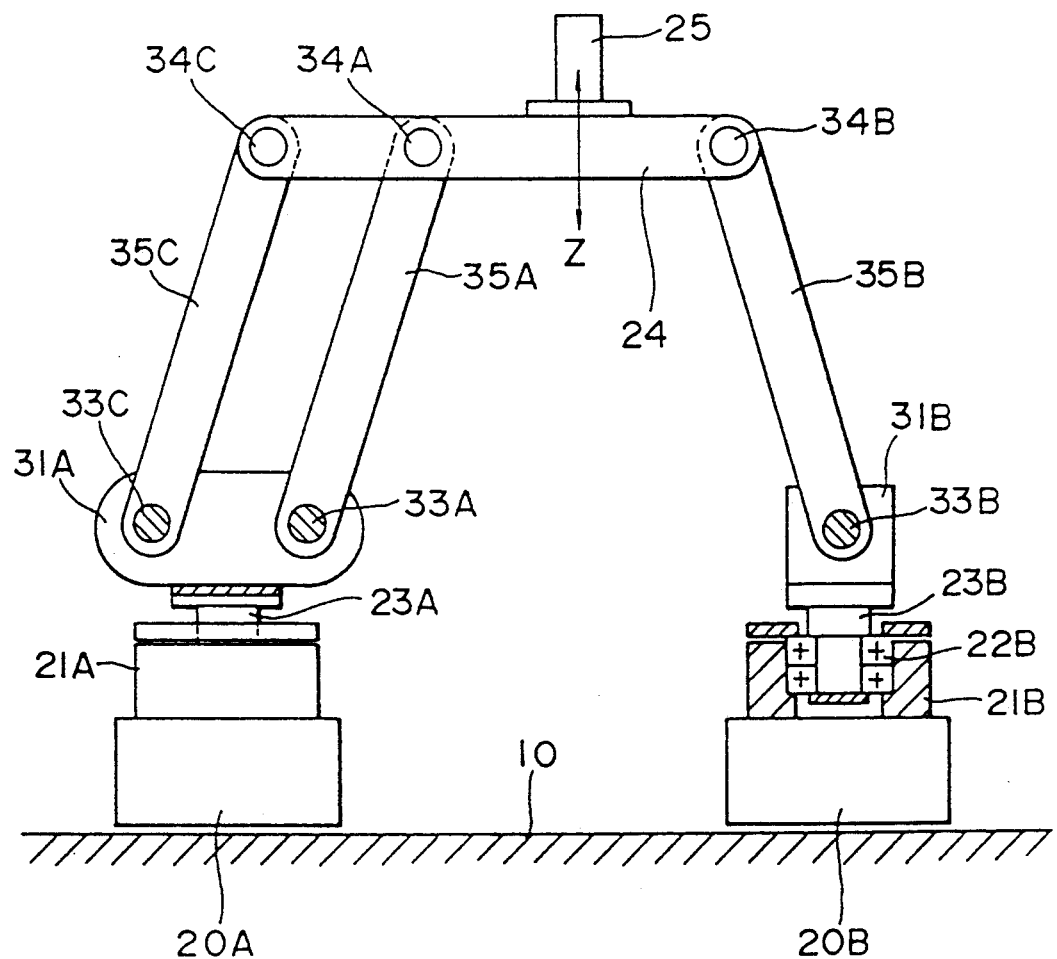
FIG. 4 is a profile view, partly sectioned, showing still another embodiment of the invention.
Figure 5:
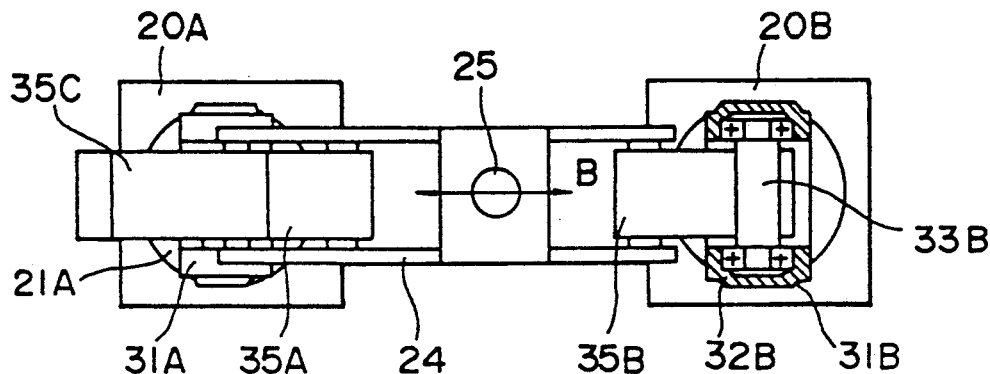
FIG. 5 is a top plan view of the embodiment shown in FIG. 4.

In still another embodiment shown in FIGS. 4 and 5, brackets 31A and 31B are secured to the shafts 23A and 23B rotatably supported by the movable members 20A and 20B. The bracket 31A has a length in the axial direction of the connecting member 24, somewhat larger than that of the bracket 31B, and through bearings (not shown), the bracket 31A rotatably supports two pivotal shafts 33A and 33C provided at the lower ends of two links 35A and 35C, at positions spaced apart by a suitable distance in a direction perpendicular to the rotatable shaft 23A. On the other hand, the connecting member 24 is provided with pivotal shafts 34A and 34C in the vicinity of one end thereof, and the upper ends of the link 35A and 35C are pivotally supported by the pivotal shafts 34A and 34C, respectively, supported by the pivotal shafts 34A and 34C, respectively, so that a parallelogrammic link mechanism is formed by the two links 35A, 35C, the bracket 31A, and a part of the connected member 24. In the vicinity of the other end of the connecting member 24 is provided a pivotal shaft 34B that pivotally supports one end of another link 35B. The bracket 31B secured to the vertical shaft 23B supports another pivotal shaft 33B extending perpendicularly to the rotatable shaft 23B through a bearing 22B, and the other end of the link 35B is secured to the pivotal shaft 33B.

The embodiment can operate in the same manner as that shown in FIGS. 1 and 2, and furthermore, by moving the movable members 20A and 20B toward or away from each other in the axial direction of the connecting member 24 (in the direction of the arrow mark B in FIG. 5) it is made possible to move the connecting member 24 upwardly and downwardly in the direction of z axis, so that a mechanism for driving the tool secured to a tool securing spindle 25 in z direction can be eliminated.

Since a parallelogrammic link mechanism is formed by the two links 35A, 35C, bracket 31A, connecting member 24, and the pivotal shafts 33A, 33C, 34A, 34C, the connecting member 24 can be controlled to maintain a horizontal posture without requiring any outside force, and therefore the tool supporting spindle 25 can be controlled by merely operating the plane pulse motor.

Figure 6:
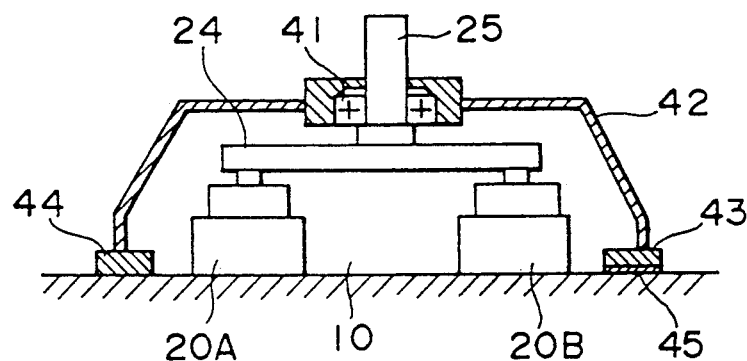
FIG. 6 is a profile sectional view showing still another embodiment of the invention.
Figure 7:
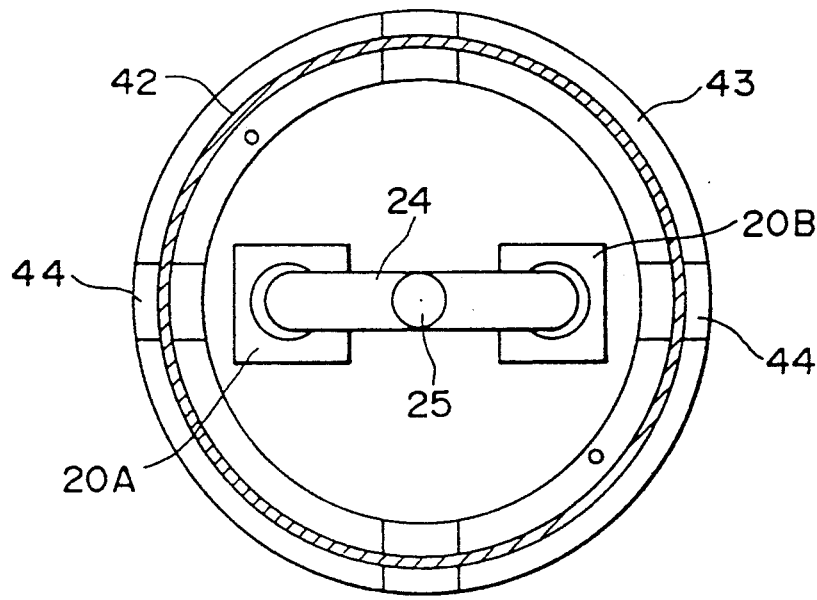
FIG. 7 is a top plan view, partly sectioned, showing the embodiment of FIG. 6.

Still another embodiment shown in FIGS. 6 and 7 is constructed in a similar manner to the embodiment shown in FIGS. 1 and 2, and furthermore, a cover 42 is provided to cover the movable members 20A and 20B and the connecting member 24 entirely, and to encase the tool supporting spindle 25 via a bearing 41. An annular member 43 is secured to the outer periphery of the cover 42 in an opposing relation to the stator 10, and at least a number of positions of the annular member 43 are provided permanent magnets 44 and air bearings 45 that blow out air to form a slight air gap.

Figure 8:
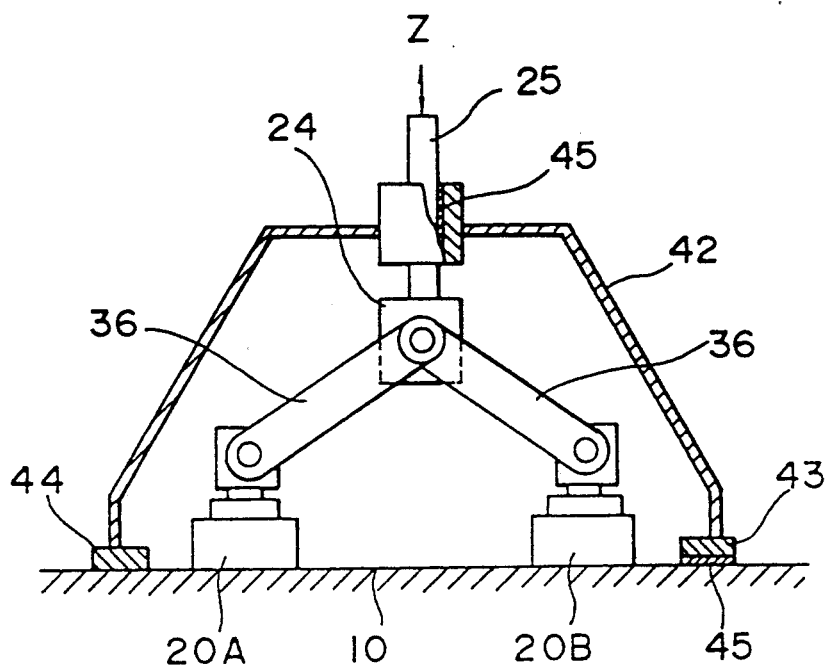
FIG. 8 is a profile sectional view showing still another embodiment of the invention.

In still another embodiment shown in FIG. 8, a connecting member 24 is moved through links 36 in the direction of A according to the movement of the movable members 20A and 20B. A cover 42 is also provided such that a tool supporting spindle 25 is movable therethrough via a slide-bearing 45, and permanent magnets 44 are provided along the annular member 43 as in the embodiment shown in FIGS. 6 and 7.

Although in the above described embodiments, the stator 10 is provided on a floor surface such that the movable members are movable thereon, it is apparent that the stator 10 may otherwise be provided on a side wall or ceiling.

Figure 9:
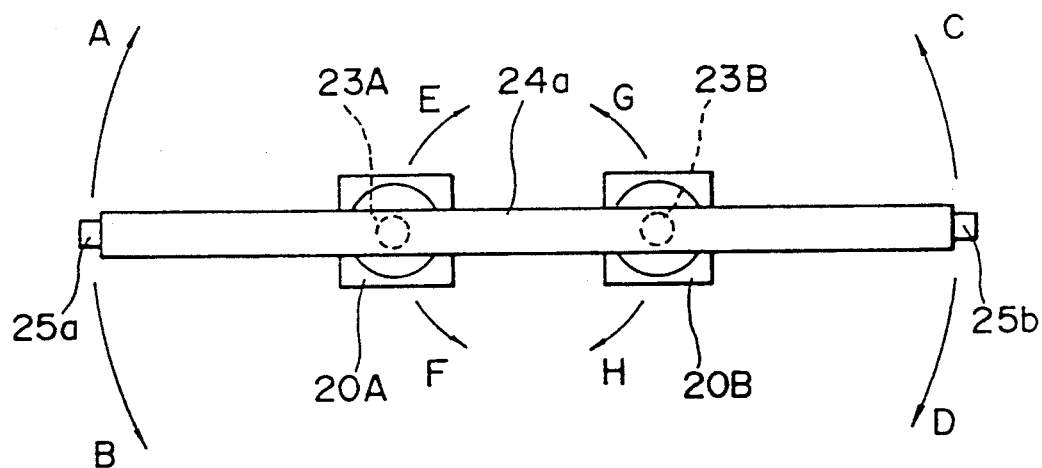
FIG. 9 is a top plan view showing a further embodiment of the invention.

In still another embodiment shown in FIG. 9, a connecting member 24a having a length larger than the distance between the movable members 20A and 20B is supported by the rotatable shafts 23A and 23B provided on the movable members 20A and 20B such that both ends of the connecting member 24a project outwardly from the movable members 20A and 20B, and tool supporting spindles 25a and 25b are secured to the ends of the connecting member 24a.

When the tool supporting spindle 25a is to be rotated in the direction of an arrow mark A, the movable member 20A is displaced in the direction of arrow mark E while the movable member 20B is held in its position or displaced in the direction of arrow-mark H. In the latter case, the movement of the tool supporting spindle 25a is made faster than that of the former case.

Likewise, when the tool supporting spindle 25a is to be rotated in the direction of arrow-mark B, the movable member 20A is displaced in the direction F while the movable member 20B is held in its position or displaced in the direction of arrow-mark G.

The rotation of the tool supporting spindle 25b in the direction of arrow-mark C or D may be carried out in a similar manner.

Not only the above described rotation, the tool supporting spindle 25a or 25b may be operated in a linear manner in a desired direction.

Since the connecting member 24a of this embodiment is made longer so that both ends of the member 24a project outwardly in excess of the movable members 20A and 20B, and since the member 24a is secured to the rotatable shafts 23A and 23B, the balance of the connecting member 24a is substantially improved, and even in a case where a heavy tool is attached to the tool supporting spindle provided at one end of the connecting member 24a, there is no possibility of upsetting or inclining the movable members 20A and 20B.

Furthermore, the tool supporting spindles 25a and 25b are secured to both ends of the connecting member 24a, and therefore in a case where two assembling or production lines are provided in parallel spaced apart by a distance, it is made possible to carry out assembling or producing operations of these lines substantially simultaneously by the manipulator placed between these lines.

INDUSTRIAL APPLICABILITY

Since a manipulator using a plane pulse motor according to the present invention is constructed such that a plurality of movable members are provided on a stator of the plane pulse motor, a rotatable shaft is provided on each movable member so as to extend vertically, the rotatable shafts are connected with each other through a connecting member, a required tool is secured to the connecting member, and the movements of the movable members are made controllable in a manner correlated with each other, it is possible to stabilize the seizure of the tool, to improve capability of withstanding the movement, to increase the degree of freedom by displacing the movable members simultaneously or separately, and to omit the provision of a rotating mechanism for the tool.

Furthermore, the manipulator may otherwise be constructed such that it comprises: a link having an end pivotally secured to the rotatable shaft of one of the movable members; two parallelogrammic links having one-side ends pivotally secured to the rotatable shaft of the other movable member; and the connecting member pivotally secured to the other side ends of the links, with the tool secured to the connecting member; and therefore are obtained advantages such as increasing the degree of freedom of tool, omitting a mechanism for moving the tool in z direction, simplifying the control of the entire manipulator, holding the connecting member horizontally without any outside force because of the provision of the parallelogrammic link mechanism, and enabling to control the tool supporting spindle by use of the plane pulse motor.

In a case where a cover is provided so as to surround the tool supporting spindle and to cover the movable members and the connecting member, while an annular member is provided at an end edge of the cover facing the stator, with permanent magnets and air bearings provided around the annular member; the mechanical portion inclusive of the movable members can be protected from dust and a corrosive atmosphere, the support of the tool supporting spindle is ensured, and a smooth movement of the movable members is made possible without being disturbed by the cover.

In a case where tool supporting spindles are provided at both ends of a long connecting member supported by two movable members, the manipulator may be operated on both sides thereof simultaneously.

Accordingly, the manipulator using a plane pulse motor of this invention may be utilized most suitably in a field of, for instance, a totally automated system in a production facility, where the tool is required to be controlled at an extremely high precision by a simplest mechanism.

What is claimed is:

1. A manipulator using a plane pulse motor with a stator, comprising:

a plurality of movable members provided on the stator of the plane pulse motor, said stator having magnetic pieces constructed in a lattice arrangement on an X-Y plane, each of said movable members supporting a bearing housing and a bearing housed in said bearing housing, the bearing of each of said movable members rotatably supports a rotatable shaft, and each of said rotatable shafts extends along a Z-axis and is adapted for rotation about the Z-axis;

a connecting member that includes end portions, each of said end portions being connected with a respective one of said rotatable shafts such that movement of said movable members is controllable in a correlated manner; and a tool supporting arm connected to said connecting member.

2. A manipulator as recited in claim 1 further comprising air bearings provided between said movable member and said stator.

3. A manipulator as recited in claim 1 further comprising a Z-axis support shaft interconnecting said tool supporting arm to said connecting member.

4. A manipulator as recited in claim 1 wherein said tool supporting arm is fixedly secured in position with respect to said connecting arm and wherein said connecting arm and tool supporting arm are each elongated and extend perpendicular to each other.

5. A manipulator as recited in claim 1 wherein said connecting member includes a central area and three outwardly extending arms each having an end region defining one of said end portions that is connected with a respective one of said rotatable shafts.

6. A manipulator as recited in claim 1 wherein said connected member is directly attached to said rotatable shafts at a first and a second attachment point and said connecting member extends both between said attachment points and external to each of said attachment points.

7. A manipulator using a plane pulse motor with a stator, comprising:
- a plurality of movable members provided on the stator of the plane pulse motor, said stator having magnetic pieces constructed in a lattice arrangement on an X-Y plane,
- a first and a second rotatable shaft supported, respectively, by a first and a second of said movable members, said rotatable shafts being supported so as to extend in a Z-axis direction and said rotatable shafts being adapted for rotation about a Z-axis,
- a first link having a first end connected to the first rotatable shaft;
- a connecting member having a first end portion pivotably connected to a second end of said first link;
- a bracket supported by said second rotatable shaft;
- second and third links each having a first end pivotally connected to said bracket, said second and third links each further having a second end pivotally connected to a second end portion of said connecting member such that said second and third links form a parallelogrammic link mechanism which, together with said first link and connecting member, provides for correlated movement of said first and second movable members; and
- a tool supporting device secured to said connecting member.

8. A manipulator as recited in claim 7 further comprising air bearings provided between said movable member and said stator, and wherein said tool supporting device includes a spindle fixedly secured to an intermediate portion of said connecting member and extending along a Z-axis.

9. A manipulator using a plane pulse motor with a stator, comprising:
- a plurality of movable members provided on the stator of the plane pulse motor, said stator having magnetic pieces constructed in a lattice arrangement on an X-Y plane;
- rotatable shafts;
- each of said movable members supporting a bearing which rotatably supports a respective one of said rotatable shafts such that said rotatable shafts extend along a Z-axis and rotate about said Z-axis;
- a connecting member having a first and a second end portion, said first end portion being connected to a first of said rotatable shafts and the second end portion being connected to a second of said rotatable shafts;
- a tool supporting device secured to said connecting member;
- a cover which is dimensioned and arranged to surround said tool support spindle and to cover said movable members and said connecting member, said cover further including an annular member; and
- permanent magnets and an air bearing provided on the annular member of said cover so as to be held in opposition to the stator.

10. A manipulator as recited in claim 9 wherein said connecting member is directly attached to said rotatable shafts.

11. A manipulator as recited in claim 9 further comprising links, a first of said links extending from the first end portion of said connecting member to one of said rotatable shafts and a second of said links extending from the second end portion of said connecting member to a second of said rotatable shafts.

12. A manipulator as recited in claim 11 wherein said first and second link members share a common pivot axis with respect to said connecting member, and said cover includes a slide bearing through which said spindle extends, said link members, cover, and spindle being dimensioned and arranged such that said spindle is shiftable within said bearing along a Z-axis upon movement of said movable members.

13. A manipulator using a plane pulse motor with a stator, comprising:
- a plurality of movable members provided on the stator, said stator having magnetic pieces constructed in a lattice arrangement on an X-Y plane, each of said movable members supporting a bearing which rotatably supports a rotatable shaft, each of said rotatable shafts extending along a Z-axis and adapted for rotation about the Z-axis;
- a connecting member interconnecting said rotatable shafts and having a length along a central axis of said connecting member which is larger than a distance extending along the central axis of said connecting member between said rotatable shafts, said connecting member interconnecting said movable members so as to provide for correlated movement between said movable members;
- a first tool support member connected to a first end of said connecting member;
- a second tool support member connected to a second end of said connecting member;

14. A manipulator as recited in claim 3 wherein said tool support members are spindles each supporting a required tool and said manipulator further comprising air bearings positioned between said movable members and said stator.

* * * * *